(12) United States Patent
Liao

(10) Patent No.: US 7,347,405 B2
(45) Date of Patent: Mar. 25, 2008

(54) INLET VALVE FOR PNEUMATIC TOOL

(75) Inventor: Chi-Shen Liao, Da Li (TW)

(73) Assignee: Mighty Seven International Co., Ltd., Wu Jih Shiang (TW)

( * ) Notice: Subject to any disclaimer, the term of this patent is extended or adjusted under 35 U.S.C. 154(b) by 0 days.

(21) Appl. No.: 10/908,900

(22) Filed: May 31, 2005

(65) Prior Publication Data

US 2006/0000998 A1  Jan. 5, 2006

(30) Foreign Application Priority Data

Jun. 30, 2004 (TW) .............................. 93210305 U

(51) Int. Cl.
  *F16K 31/00* (2006.01)
(52) U.S. Cl. .................. 251/83; 251/339; 137/614.16; 137/614.18
(58) Field of Classification Search .................. 251/82, 251/83, 339; 137/614.16, 614.17
See application file for complete search history.

(56) References Cited

U.S. PATENT DOCUMENTS 2,180,188 A * 11/1939 Ashworth .............. 137/630.14
4,631,012 A * 12/1986 Eckman ........................ 418/70
5,785,228 A * 7/1998 Fa et al. ......................... 227/8
5,788,219 A * 8/1998 Nakajima .................... 251/339
6,443,239 B1 * 9/2002 Izumisawa ................... 173/169

OTHER PUBLICATIONS

Taiwan Patent Publication No. 567954, Dec. 21, 2003, 8 pages.

* cited by examiner

*Primary Examiner*—Gregory Huson
*Assistant Examiner*—John K. Fristoe, Jr.
(74) *Attorney, Agent, or Firm*—Alan Kamrath; Kamrath & Associates PA

(57) ABSTRACT

An inlet valve is provided for a pneumatic tool. The pneumatic tool defines a space and a passageway communicated with the space. The inlet valve includes a housing and a plunger. The housing is movable in the space between a first position where it blocks the space from the passageway and a second position where it allows the communication between the space and the passageway. The housing defines an inlet and an outlet. The plunger is inserted through the outlet and movable in the pneumatic tool between a first position, a second position and a third position. An end of the plunger is put in the housing for pushing the housing, from inside, to the second position as the plunger is in the third position. The plunger includes an annular flange put in the housing for blocking the outlet as the plunger is in the first position and for opening the outlet as the plunger is in the second position.

13 Claims, 4 Drawing Sheets

INLET VALVE FOR PNEUMATIC TOOL

BACKGROUND OF INVENTION

1. Field of Invention

The present invention relates to a pneumatic tool and, more particularly, to an inlet valve for a pneumatic tool.

2. Related Prior Art

Pneumatic tools are convenient and efficient tools for drilling and driving screws. In Taiwanese Patent Publication 567954, for example, is disclosed an inlet valve for a pneumatic tool. The pneumatic tool includes a pistol-shaped body 200. The inlet valve includes a ring 20 put in the body 200, a housing 30 connected to the ring 20, a ball 40 put in the housing 30, a sealing washer 50 put between the housing 30 and the ball 40, and a C-ring 60 put in the housing 30 for restraining the ball 40 in the housing 30. The housing 30 defines a space 35 and an aperture 36 communicated with the space 35. The ball 40 is put in the space 35. An end of a rod 91 can be inserted in the space 35 through the aperture 36. An opposite end of the rod 91 can be pushed by a trigger 10 installed on the body 200. Normally, the ball 40 rests against the sealing washer 50 and blocks the aperture 36. When the trigger 10 is pulled, the ball 40 is pushed from the sealing washer 50 due to the rod 90 put between the trigger 10 and the ball 40. However, the use of the pneumatic tool with this conventional inlet valve is not convenient in some cases. An example is made of an operation where the pneumatic tool is used to drive nuts for fastening a wheel to a vehicle. At first, the nuts are loosely engaged with bolts that carry the wheel. Only after all of the nuts are loosely engaged with bolts is the engagement tightened. This operation requires some personal skills to operate the pneumatic tool in a two-step manner. This operation is troublesome.

The present invention is therefore intended to obviate or at least alleviate the problems encountered in the prior art.

SUMMARY OF INVENTION

According to the present invention, an inlet valve is provided for a pneumatic tool. The pneumatic tool defines a space and a passageway communicated with the space. The inlet valve includes a housing and a plunger. The housing is movable in the space between a first position where it blocks the space from the passageway and a second position where it allows the communication between the space and the passageway. The housing defines an inlet and an outlet. The plunger is inserted through the outlet and movable in the pneumatic tool between a first position, a second position and a third position. An end of the plunger is put in the housing for pushing the housing, from inside, to the second position as the plunger is in the third position. The plunger includes an annular flange put in the housing for blocking the outlet as the plunger is in the first position and for opening the outlet as the plunger is in the second position.

The primary advantage of the pneumatic tool equipped with the inlet valve according to the present invention is the two-step operation.

Other advantages and novel features of the invention will become more apparent from the following detailed description in conjunction with the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
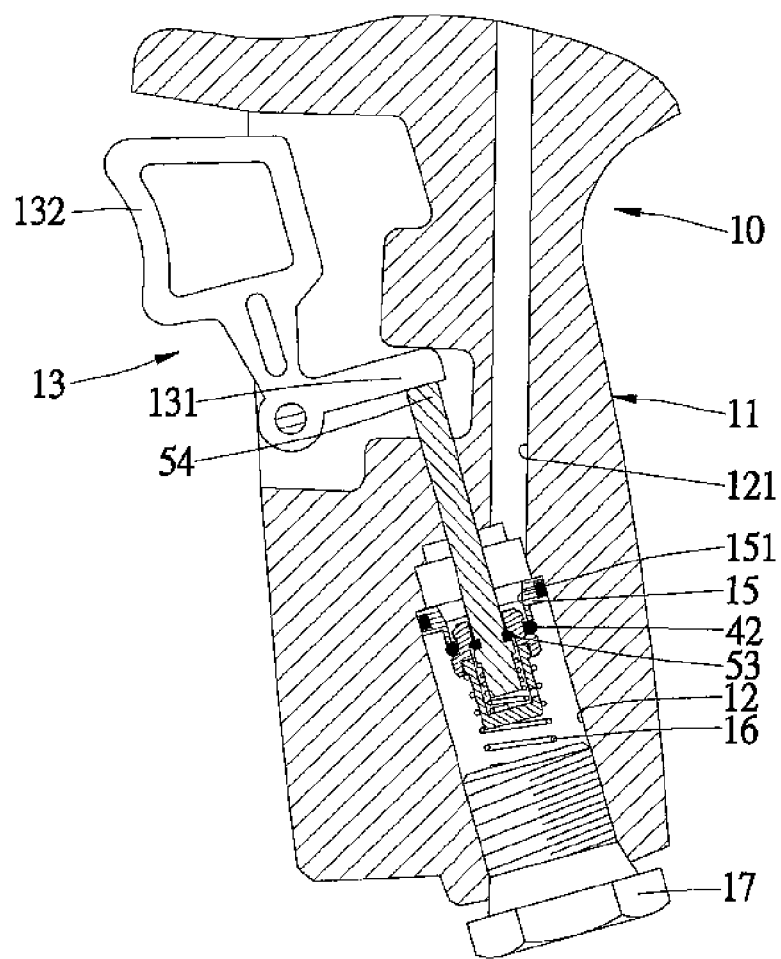
FIG. 1 is a cross-sectional view of a pneumatic tool with an inlet valve according to the preferred embodiment of the present invention.
Figure 2:
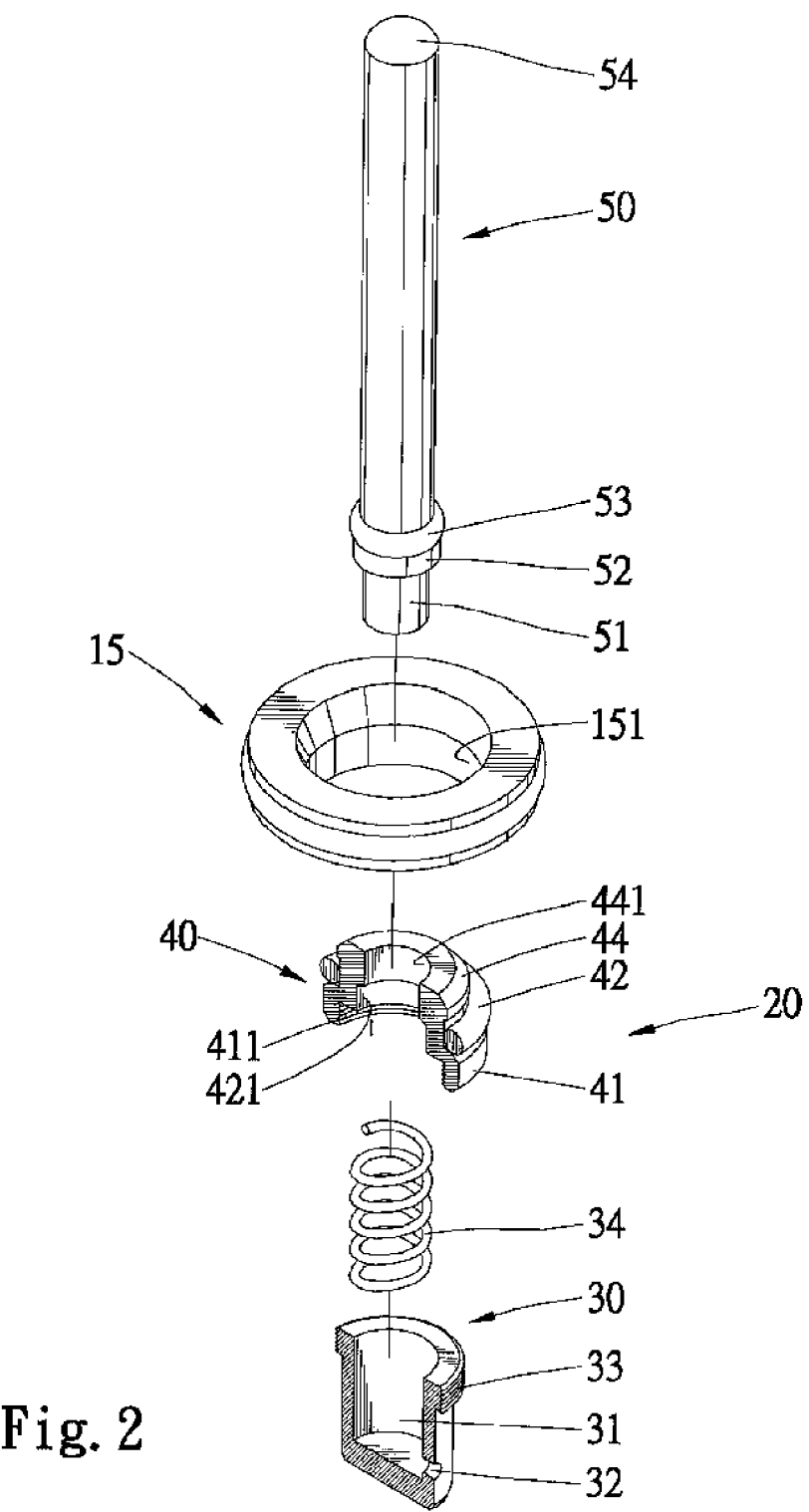
FIG. 2 is an exploded view of the inlet valve shown in FIG. 1.

Referring to FIGS. 1 and 2, a pneumatic tool 10 is equipped with an inlet valve according to the preferred embodiment of the present invention. The pneumatic tool 10 includes a pistol-shaped body that is only shown partially. The pistol-shaped body includes a barrel (not shown), a handle 11 extended from the barrel, and a trigger 13 put on the handle 11. The handle 11 defines a space 12 and a passageway 121 communicated with the space 12. Pressurized air can travel through the space 12 and the passageway 121. The inlet valve is put in the space 12 in order to control the travel of the pressurized air.

The inlet valve includes a washer 15, a housing 20, a plunger 50, and a spring 34. The washer 15 is put in the space 12 against an annular shoulder formed on the wall of the space 12. The washer 15 defines an aperture 151.

The housing 20 is put in the space 12 against the washer 15. The housing 20 includes a first shell 30 and a second shell 40. The second shell 40 includes a first section 41 and a reduced second section 44 raised from the first section 41. An annular seal 42 is put around the second section 44 of the second shell 40. The annular seal 42 is put against the washer 15. The second shell 40 defines a first space (not numbered), a second space 421 communicated with the first space, and a third space 441 communicated with the second space 421. A thread 411 is formed on the wall of the first space defined in the second shell 40.

The first shell 30 defines a space 31 and an aperture 32 communicated with the space 31. Thus, the pressurized air travels into the space 31 from the space 12 through the aperture 32. A thread 33 is formed on the first shell 30. The thread 33 is engaged with the thread 411 after the spring 34 and a portion of the plunger 50 (to be described) are put in the housing 20.

The plunger 50 includes a first end 51, an opposite second end 54, an annular flange 52 formed near the first end 51, and an annular seal 53 put against the annular flange 52. The first end 51, the annular flange 52, and the annular seal 53 are put in the housing 20. The annular seal 53 can be used to block the communication between the second space 421 and the third space 441 defined in the second shell 40.

The spring 34 is put around the first end 51 of the plunger 50 and compressed between the annular flange 52 and the bottom of the first shell 30.

A spring 16 is put in the space 12. A hollow restraint 17 is put in the space 12 in order to restrain the inlet valve in the space 12. A thread formed on the hollow restraint 17 is engaged with a thread formed on the wall of the space 12. The spring 16 is compressed between the hollow restraint 17 and the first shell 30. Because of the spring 16, the annular seal 42 is pressed against the washer 15.

The trigger 13 includes a first portion 131 and a second portion 132 extended from the first portion 131. The first portion 131 of the trigger 13 is in contact with the second end 54 of the plunger 50. The second portion 132 of the trigger 13 can be pulled.

Figure 3:
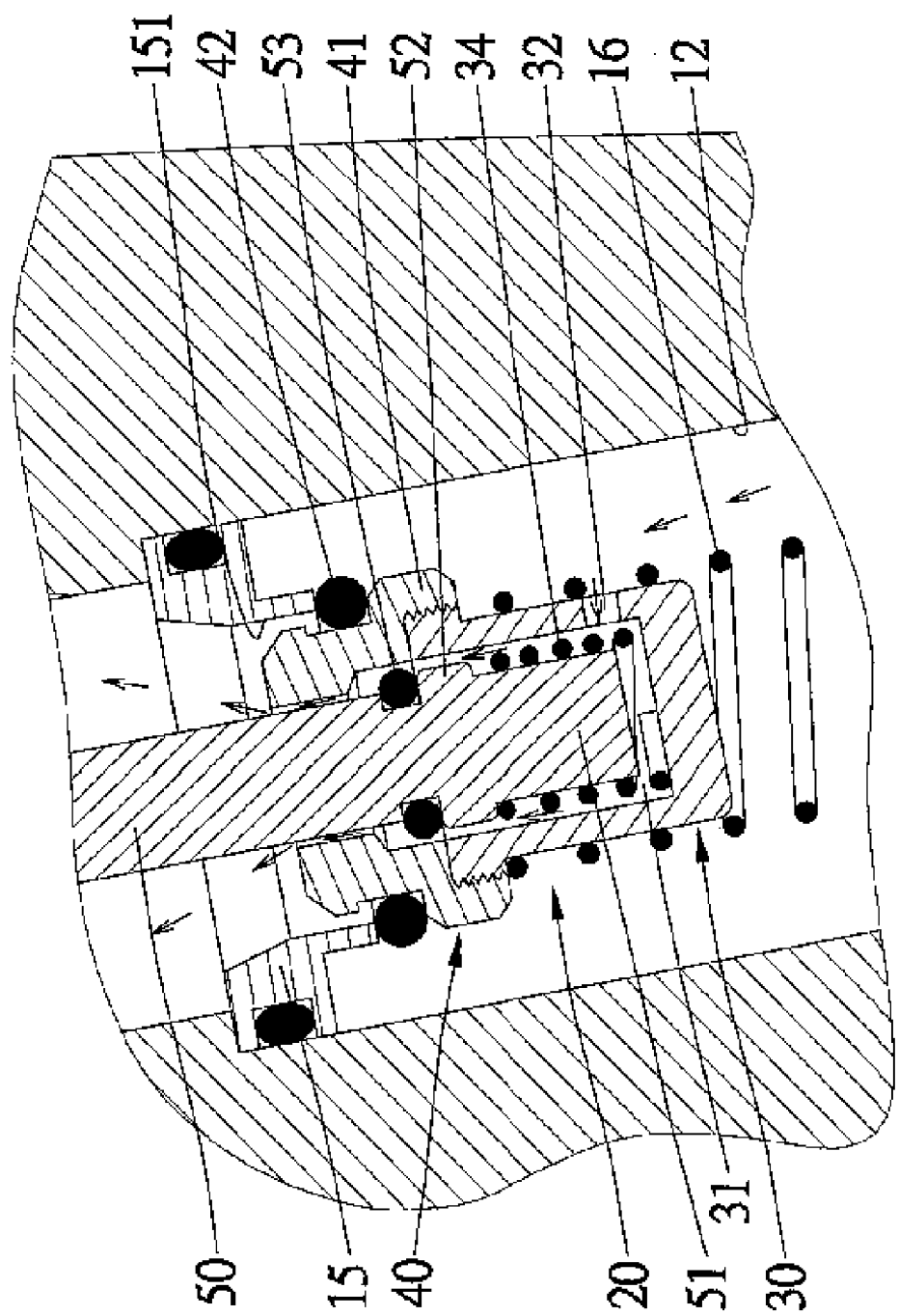
FIG. 3 is a cross-sectional view of the inlet valve shown in FIG. 1 at a first step of operation.

Referring to FIG. 3, a first step of the operation of the inlet valve will be described. At the first step, the second portion 132 of the trigger 13 is slightly pulled. The first portion 131 of the trigger 13 pushes the plunger 50. The annular seal 53 is moved from the internal side of the second shell 40. The pressurized air travels to the passageway 121 from the space 31 of the first shell through the second space 421 and the third space 441 of the second shell 40.

Figure 4:
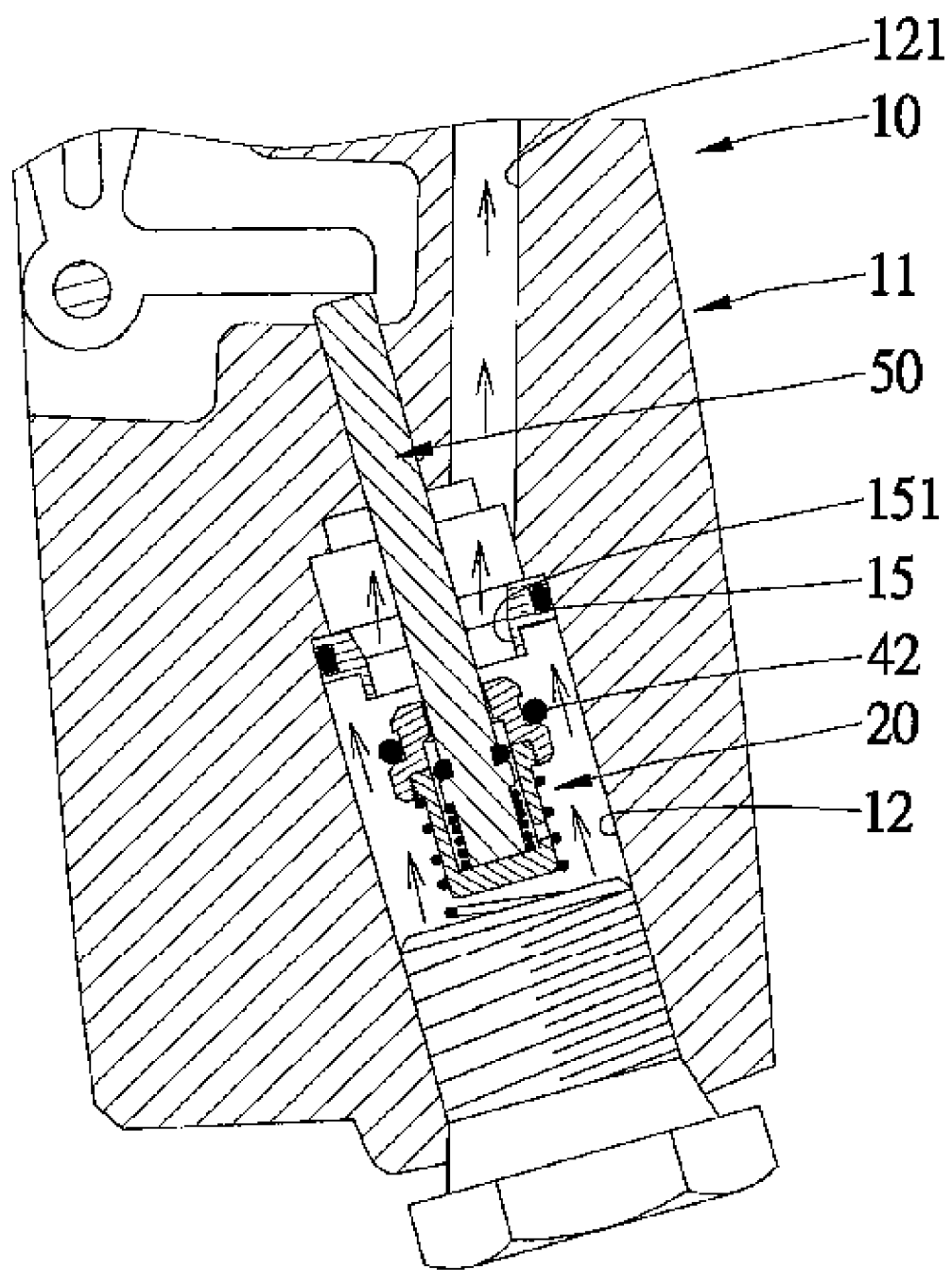
FIG. 4 is a cross-sectional view of the inlet valve shown in FIG. 1 at a second step of operation.

Referring to FIG. 4, a second step of the operation of the inlet valve will be described. At the second step, the second portion 132 of the trigger 13 is fully pulled. The first portion 131 of the trigger 13 fully pushes the plunger 50. The annular seal 53 is moved from the internal side of the second shell 40. The first end 51 of the plunger 50 is brought into contact with the floor of the space 31 of the first shell 30. The housing 20 is moved from the washer 15. Specifically, the annular seal 42 is moved from the washer 15. The pressurized air travels to the passageway 121 from the space 12 through the aperture 151. The pressurized air travels through the pneumatic tool 10 at a higher rate at the second step than at the first step.

Advantages of the pneumatic tool 10 equipped with the inlet valve of the present invention will be discussed in an exemplary operation where it is used to drive nuts for fastening a wheel to a vehicle. At first, the nuts are loosely engaged with bolts on which the wheel is installed. Only after all of the nuts are engaged with the bolts loosely is the engagement tightened. Thus, the wheel is attached to the vehicle adequately. To this end, a user operates the trigger 13 to a first extent in order to actuate the inlet valve to the first step. At this instant, the user can only engage the nuts with the bolts loosely no matter how long he or she operates the trigger 13. Then, the user operates the trigger 13 to a second extent in order to actuate the inlet valve to the second step. At this instant, the user can tighten the engagement of the nuts with the bolts. With the pneumatic tool 10 equipped with the inlet valve of the present invention, the user can attach the wheel to the vehicle adequately without skills.

The present invention has been described through the detailed description of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An inlet valve for a pneumatic tool, the pneumatic tool defines a space and a passageway communicated with the space, the inlet valve comprising:
   a housing movable in the space between a first position where it blocks the space from the passageway and a second position where it allows the communication between the space and the passageway, the housing defining an inlet and an outlet;
   a plunger inserted through the outlet and movable in the pneumatic tool between a first position, a second position and a third position, with the plunger comprising:
   an end put in the housing for pushing the housing, from inside, to the second position as the plunger is in the third position; and
   an annular flange put in the housing for blocking the outlet as the plunger is in the first position and for opening the outlet as the plunger is in the second position;
   a spring put in the space for pushing the housing to the first position; and
   a second spring put in the housing for pushing the annular flange to the first position.

2. The inlet valve according to claim 1 comprising a washer put in the space for sealing contact with the housing in the first position, the washer defines an aperture through which pressurized air can travel.

3. The inlet valve according to claim 2 comprising an annular seal put on the housing for sealing contact with the washer.

4. The inlet valve according to claim 3 wherein the housing comprises a first shell of a cup shape in which the inlet is defined, and wherein a second shell comprises a cover for the cup shape and in which the outlet is defined.

5. The inlet valve according to claim 4 wherein the first shell comprises a thread formed thereon, wherein the second shell comprises a thread formed thereon and engaged with the thread of the first shell.

6. The inlet valve according to claim 2 wherein the plunger comprises an opposite end put outside the housing and in contact with a trigger so that the trigger is operable in order to push the plunger to the third position from the first position through the second position.

7. The inlet valve according to claim 1 comprising an annular seal put on the annular flange for blocking the outlet.

8. The inlet valve according to claim 1 wherein the housing comprises a first shell of a cup shape in which the inlet is defined, and wherein a second shell comprises a cover for the cup shape and in which the outlet is defined.

9. The inlet valve according to claim 8 wherein the first shell comprises a thread formed thereon, wherein the second shell comprises a thread formed thereon and engaged with the thread of the first shell.

10. The inlet valve according to claim 8 comprising a washer put in the space for sealing contact with the housing in the first position, the washer defines an aperture through which pressurized air can travel.

11. The inlet valve according to claim 10 comprising an annular seal put on the housing for sealing contact with the washer.

12. The inlet valve according to claim 8 comprising an annular seal put on the annular flange for blocking the outlet.

13. The inlet valve according to claim 1 wherein the plunger comprises an opposite end put outside the housing and in contact with a trigger so that the trigger is operable in order to push the plunger to the third position from the first position through the second position.

* * * * *